United States Patent
Burrow et al.

(10) Patent No.: US 12,113,312 B2
(45) Date of Patent: Oct. 8, 2024

(54) SUBSEA CONNECTOR

(71) Applicant: Siemens Energy Global GmbH & Co. KG, Bayern (DE)

(72) Inventors: Christopher Burrow, Ulverston (GB); Scott Spencer, Barrow-in-Furness (GB); Daniel Walton, Carnforth (GB)

(73) Assignee: Siemens Energy Global GmbH & Co. KG, Munich (DE)

( * ) Notice: Subject to any disclaimer, the term of this patent is extended or adjusted under 35 U.S.C. 154(b) by 301 days.

(21) Appl. No.: 17/636,867

(22) PCT Filed: Aug. 27, 2020

(86) PCT No.: PCT/EP2020/073915
§ 371 (c)(1),
(2) Date: Feb. 19, 2022

(87) PCT Pub. No.: WO2021/037949
PCT Pub. Date: Mar. 4, 2021

(65) Prior Publication Data
US 2022/0336996 A1    Oct. 20, 2022

(30) Foreign Application Priority Data
Aug. 30, 2019   (GB) .................................... 1912501

(51) Int. Cl.
*H01R 13/00* (2006.01)
*G02B 6/38* (2006.01)
(Continued)

(52) U.S. Cl.
CPC ......... *H01R 13/523* (2013.01); *G02B 6/3816* (2013.01); *H01R 13/005* (2013.01);
(Continued)

(58) Field of Classification Search
CPC ................ H01R 13/523; H01R 13/005; H01R 13/6585; H01R 33/94; G02B 6/3816
See application file for complete search history.

(56) References Cited

U.S. PATENT DOCUMENTS

| 6,179,585 B1 | 1/2001 | Kobylinski et al. |
| 9,083,101 B2 * | 7/2015 | Watson .............. H01R 13/5202 |

(Continued)

FOREIGN PATENT DOCUMENTS

| CN | 107834276 A | 3/2018 |
| CN | 108539503 A | 9/2018 |
| CN | 109462065 A | 3/2019 |

OTHER PUBLICATIONS

International search report and written opinion dated Nov. 3, 2020 for corresponding PCT/EP2020/073915.

*Primary Examiner* — Phuong Chi Thi Nguyen
(74) *Attorney, Agent, or Firm* — Wolter Van Dyke Davis, PLLC

(57) ABSTRACT

A configurable subsea wet-mateable connector includes a receptacle connector body and a plug connector body. The subsea receptacle connector unit includes at least two receptacle inserts chosen from at least one of a power connector unit, a data connector unit, an optical fibre connector unit, a pneumatic connector unit or a fluid connector unit. The subsea plug connector unit includes at least two plug inserts having the same two of a power connector unit, a data connector unit, an optical fibre connector unit, a pneumatic connector unit or a fluid connector unit.

9 Claims, 5 Drawing Sheets

(51) Int. Cl.
 *H01R 13/523* (2006.01)
 *H01R 13/6585* (2011.01)
 *H01R 33/94* (2006.01)
 *H02G 15/14* (2006.01)

(52) U.S. Cl.
 CPC ......... *H01R 13/6585* (2013.01); *H01R 33/94* (2013.01); *H02G 15/14* (2013.01)

(56) References Cited

U.S. PATENT DOCUMENTS

2010/0252269 A1  10/2010  Legrand
2018/0076561 A1  3/2018  Aoshima

* cited by examiner

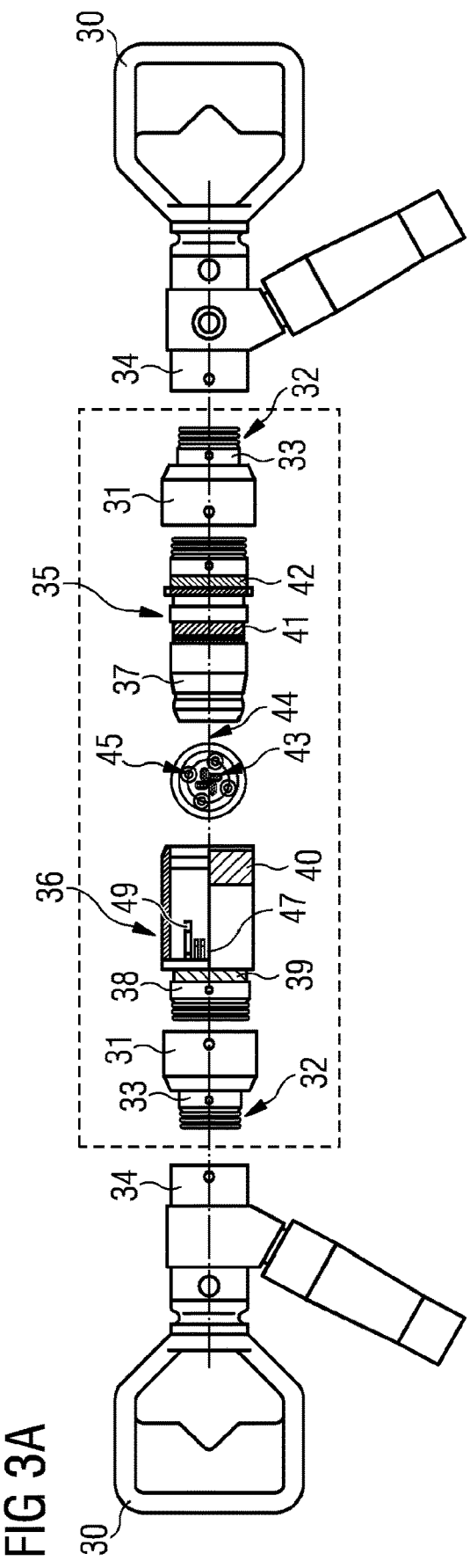
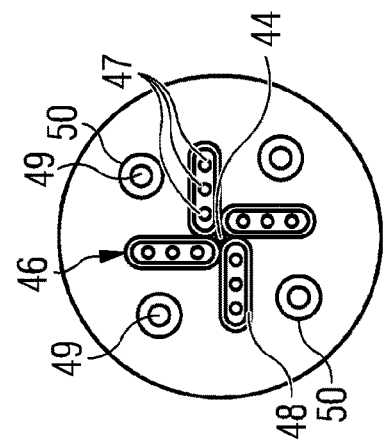
FIG 3A
FIG 3B

SUBSEA CONNECTOR

CROSS REFERENCE TO RELATED APPLICATIONS

This application is the US National Stage of International Application No. PCT/EP2020/073915 filed 27 Aug. 2020, and claims the benefit thereof. The International Application claims the benefit of United Kingdom Application No. GB 19125012 filed 30 Aug. 2019. All of the applications are incorporated by reference herein in their entirety.

FIELD OF INVENTION

This invention relates to a configurable subsea, or underwater, connector and a method of operating the connector.

BACKGROUND OF INVENTION

Subsea, or underwater, connectors are designed to operate beneath the surface of the water. Typically, a subsea connector comprises two parts, generally known as plug and receptacle. The receptacle may include one or more conductor pins and the plug may include corresponding plug sockets for the receptacle conductor pins. The connection may be made topside (dry-mate), or subsea (wet-mate) and the specific design is adapted according to whether the connector is a wet-mate or dry-mate connector. Subsea connectors have various applications including power connectors which supply power to subsea equipment, or control and instrumentation connectors which exchange data between different pieces of subsea equipment, or between subsea equipment and topside devices.

Conventionally, separate connectors have been provided for power or communications applications because of the very different requirements that these applications have. However, for wet-mate connectors, in particular, as each connector must be separately mated and de-mated, this takes up a lot of space as each connector must have sufficient room for an ROV or diver to be able to manipulate the connectors underwater. An improved connector is desired.

SUMMARY OF INVENTION

In accordance with a first aspect of the present invention, a subsea wet-mateable connector comprises a receptacle connector body and a plug connector body; the receptacle connector body of the connector further comprising at least two receptacle inserts chosen from at least one power connector units, data connector units, optical fibre connector units, pneumatic connector units or fluid connector units; and the subsea plug connector unit comprising at least two plug inserts comprising the same combination of units chosen from power connector units, data connector units, optical fibre connector units, pneumatic connector units or fluid connector units.

The configurable nature of the subsea connector allows the user to choose specific combinations of type of subsea connector unit to include in the connector inserts, each of which is separately manufactured to subsea requirements, but maintain a standard shape and size of connector body. Both the plug and receptacle connector bodies comprise the same combination of inserts, but that combination may be customised according to the requirements that the user has for that particular connector, so not all plug and receptacle body pairs have to be manufactured with the same number and combination of inserts.

The subsea connector plug connector body and the subsea receptacle connector body may comprise all the same type of connector insert, i.e. all power, or all data, but alternatively, the bodies comprise at least two different types of insert chosen from the selection of connector units, such as power and data, power and fibre, fibre and data, power and pneumatic, data and fluid, or any other combination of two or more types, or combination of different numbers of any of those.

This has the advantage that each connector unit may be optimised for its function, rather than having to accept a compromise in rating, size or performance to enable more than one type of connector unit function to be incorporated in a connector.

The connector may further comprise an adaptor for removably mounting the plug or receptacle connector body to an installation device.

This allows the connector to be wet mated or demated in its subsea location by whatever means, such as a diver, or ROV.

The power connector unit may comprise a copper, or copper alloy, conductor.

For example, the alloy may be Beryllium or Tellurium alloy.

These have the advantage of a low electrical resistance, reducing losses during power transmission.

Any suitable combination of connector types may be used, but in one embodiment, the data connector unit comprises one of Ethernet, optical fibre, copper wire, wireless or an inductive connector.

The fibre connector unit may comprise an expanded beam fibre connector.

This has the advantage of being small and simple in design, yet able to operate in many situations.

The connector inserts may further comprise electrical shielding for the data connector unit when one of the at least two connector units comprises a power connector unit. The electrical shielding may comprise a metal screen, for example, a metallic component, or a metallic coating, such as a plated, or painted metal coating.

This allows data and power to be combined in a single connector body, without the data suffering from electrical interference. In some case, the power connector unit may also include shielding.

The connector units of the inserts may comprise integrally formed sections of the inserts, or may themselves be inserted into a preformed body, for example a PEEK moulding.

The receptacle connector body, or plug connector body, may comprise a single machined body having an opening machined therein for each insert and one or more seals to seal the inserts to the body. The seals are typically elastomeric seals, although in some case metal seals may be used. Alternatively, the connector body may be formed of a suitable plastics material, for example, by moulding, with the required openings formed in the body and the inserts sealed to the body with a suitable sealant.

BRIEF DESCRIPTION OF THE DRAWINGS

An example of a subsea connector and associated method of operation in accordance with the present invention will now be described with reference to the accompanying drawings in which:

FIGS. 3a and 3b show an example of a connector according to the present invention, with more detail of one configuration;

DETAILED DESCRIPTION OF INVENTION

The drive to reduce overall lifecycle costs, both capital expenditure (CAPEX) and operational expenditure (OPEX), associated with new deep-water oil and gas developments means that improvements to existing designs, manufacturing processes and operation are desirable. Subsea connector systems are desired that have a lower cost, can be relatively quickly and easily installed and that have reduced maintenance requirements, or need for intervention which affects the systems to which they are connected throughout their working life.

Typically, specific connectors are used for specific applications and may be single or multi-way connectors. For example, a 4-way connector is known for delivering power, a 12-way connector for data transfer via Ethernet, or a connector for optical fibres. Wet mateable controls connectors typically have large numbers of thin conductor pins, in order that multiple control signals to different parts of a product can be included in a single control cable. For example, multiple subsea sensors on different pieces of equipment, such as flow sensors, temperature sensors, or pressure sensors each need to have a separate communication path, so that they can be interrogated, monitored and if necessary actuators can be energised, for example to open or close a valve, or to start or stop a pump.

Power transmission may be for the purpose of supplying power to subsea equipment to enable it to operate, for example to close a valve, or drive a pump. Wet mateable power connectors may have a single pin and socket arrangement, or may be multi-way connectors. Communications or control signals tend to have relatively low data rates, low current and very low voltages, for example 10V to 100V and existing multiway connectors for power applications may operate at 600V to 900V, rarely above 1 kV. However, although the data usage only needs to be rated up to 100V, when a single connector is required to perform both the data and power functions, then the conductor pins must be rated for 600V to 900V, or up to 1 KV. Some power supply type applications may fall within this range, for example energising a small relay or operating a small valve, there is a demand for a more effective source of power, which does not increase the overall size of the connectors or interfere with the effective operation of the control and communications signals. More generally, the size and rating of the conductor pins is excessive for the data application and an optimised connector is desirable.

Figure 1A:
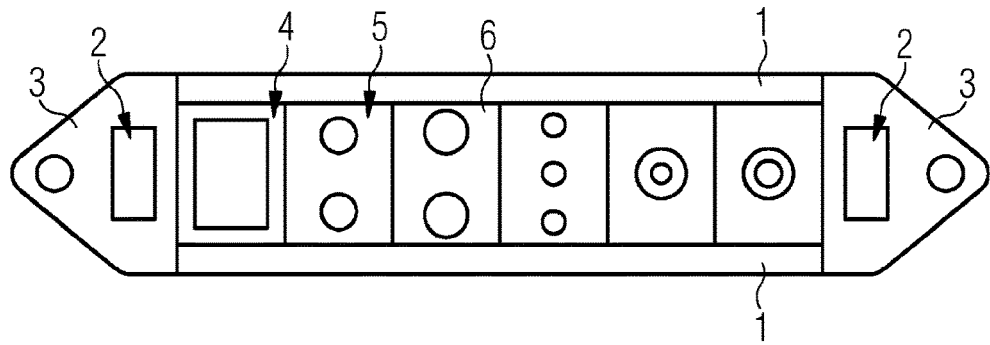
FIGS. 1a and 1b illustrate an example of a conventional topside connector arrangement.
Figure 1B:
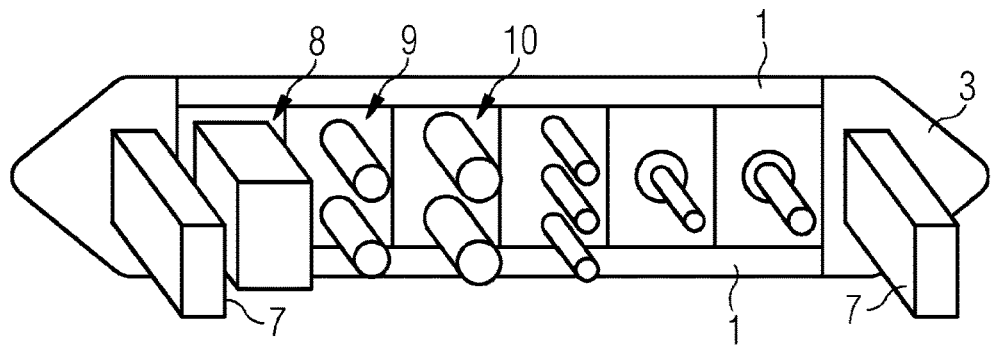

It is known, for topside applications, to provide a plurality of different types of connectors, such as power, data, fibre optics, pneumatic and fluid connections in a single frame, as illustrated in FIGS. 1a and 1b, so that these can be mounted conveniently for access, mating and demating of the connectors in a single action. However, these sockets in the frame are only suitable for use topside. Currently, there are no single subsea wet mateable connectors available that can be configured to multiple specific applications as proposed in the present application. Although, US20100252269 describes a subsea system in which a control/communication box, or control/distribution box, is provided with empty ports into which a connector can be wet mated at a later date, subsea, there is no suggestion that the later added connector is in any way configurable itself. The present invention addresses the problems discussed above by providing a hybrid connector having a combination of low power communications and control signal carriers, power transmission, or optical fibres. This allows the conductor pins and overall connector unit size to be optimised for the function performed yet fit into a single connector body for ease of operation, deployment and retrieval subsea.

Figure 2:
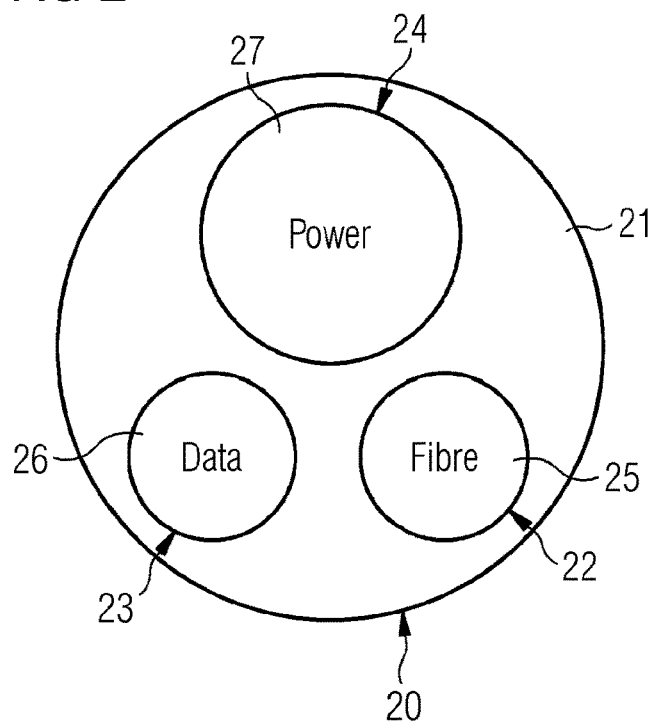
FIG. 2 is a schematic illustration of part of a hybrid configurable wet mateable connector according to the present invention.

Further details of the present invention can be understood from the description which follows and the accompanying drawings. A simplified form of an example of a configurable connector according to the present invention is shown in FIG. 2. The connector comprises a connector body 20 into which an insert 21 may be mounted with suitably sized and located sleeves 22, 23, 24 for each of the required types of connection 25, 26, 27. In this example, a sleeve 24 for a power connector 27 has a larger diameter than sleeves 23, 22 for data 26, or fibre 25 connectors. The connector body 20 typically comprises a sea water corrosion resistant metal, such as stainless steel, super duplex, or other alloy having a wall thickness of at least 2 mm. The body 20 is machined with suitably sized openings to accept a predefined arrangement of inserts 21, for example three inserts, or four inserts, per body 20, but the arrangement of the subsections within the insert may take many forms, examples of which are given in FIGS. 6a to 6g The material of the insert 21 is chosen according to the particular combination and arrangement of individual types of connector. For example, as shown here, the presence of a power connector unit 27 means there is a requirement for substantial electrical shielding to be part of the insert 21 or sleeve 23, 24 of at least one of the power or the data connector units 27, 26, to prevent interference from power cables or the power connector affecting the data signal, whereas an example with only data and fibre connector units would have a lower shielding requirement.

The insert 21 may comprise a thermoplastic polymer, such as PEEK. The insert is inserted into a machined hole in the body 20 and then sealed to the metal. Each component within the sleeve 22, 23, 24 of the insert 21 may comprise discrete component that are inserted into orifices in the insert after being separately manufactured, or the components may be overmoulded with the necessary layers as an integral part of the manufacture of the insert 21, with the sleeve as the final layer. For example, the formation of the individual inserts may be by overmoulding layers of suitable material onto the conductors or pins or cables of whichever type, e.g. power, data, fibre, pneumatic or fluid, to achieve the desired properties, for example with respect to shielding, electrical continuity and insulation resistance. The components may be moulded over with PEEK, for example. Alternatively, the insert 21 may be premoulded with hollow openings of a suitable size and cross section for the type of component intended to make up a particular connector. These options apply for both the plug part and the receptacle part.

The connector unit options are not limited to power, fibre and data, but may also include signal connectors, expanded beam fibre optic connectors, wireless connectors, such as radio frequency (RF) or Bluetooth®, hydraulic or other types of fluid connectors. The connector body forms part of a conventional structure according to its application, such as a connector for mateing and demateing by a remotely operated vehicle (ROV), for stab, or diver mating, with a suitable adaptor such as a latch for ROV, or screw thread for a diver mate.

The conductor pins in each connector, along with other aspects of the connector, such as the sealing techniques and pin layout are chosen to meet the requirements of the design specification for their particular subsea application, whilst optimising the size of the connector unit and its parts. The connector unit is made as small as possible for the required functionality, also saving cost and material.

FIGS. 3a and 3b illustrate more detail of one example of the configurable connector for hybrid power and data, with more detail of how it fits with an ROV mate handle for installation or removal. The invention is not limited to use with an ROV mate handle, but this is used for illustration. The connector may comprise discrete connector modules, or units, as described above, that each have the same interface. These modules may be of various different types, or combinations thereof, such as power, data, fibre, or communications connector units e.g. single power pins, dual power pins, 4 & 8-way communications modules, single 'expanded beam' fibre modules, RF power or communications modules, amongst others. The modules may then be organized within a common connector body to suit specific customer applications.

As shown in FIG. 3a, a conventional ROV mate handle 30 may be used with the configurable hybrid connector of the present invention by providing a suitable compatibility adaptor 31. In this example, a screw thread 32 is shown on an outer circumference of an end 33 of the adaptor 31 to fit with a corresponding screw thread (not shown) within the body 34. At the opposite end of the adaptor 31, an inner circumference screw thread (not shown) is designed to fit with a corresponding screw thread on an outer circumference of the plug connector part body 35 or the receptacle connector part body 36. Preferably, the same design of compatibility adaptor 31 may be used with both the plug connector part body 35 and the receptacle connector part body 36. This reduces cost and complexity by requiring fewer parts to be manufactured, purchased and stored, as compared to having plug or receptacle specific adaptors.

Each of the plug and receptacle connector part bodies 35, 36 comprise a universal body 37, 38 onto which is mounted a specific plug or receptacle configuration according to the specific requirements for that connector. Universal receptacle body 38 is provided with two interfaces, a mounting configuration interface 39 and a use configuration 40, for example an interface configured for an ROV, a stab, or diver mate. Similarly, the universal plug body 37 is provided with a use configuration interface 41, for example an interface configured for an ROV, a stab, or diver mate and a mounting configuration interface 42. In this particular example, it can be seen that a data module, or unit 43 is mounted around a centreline 44 of the connector and a power module 45 is mounted radially outwardly of the data module 43. The data module of this example comprises sets 46 of three data connector pins 47 in line, each set being at 90° to the immediately adjacent set 46 around the centreline 44. Each set of data pins is typically provided with electrical shielding 48 to reduce electromagnetic interference from the surrounding power connector pins 49. Each power connector unit pin 49 may also be individually electrically shielded by shielding 50 Other arrangements and combinations of connector types and connector pins are equally possible. Each connector unit may be constructed and tested before being assembled into a connector body. Termination may be carried out before or after assembly. Incorrect installation subsea may lead to damage due to cross threading of different connector unit types, so suitable indicators are provided to reduce the likelihood of this.

Figure 4:
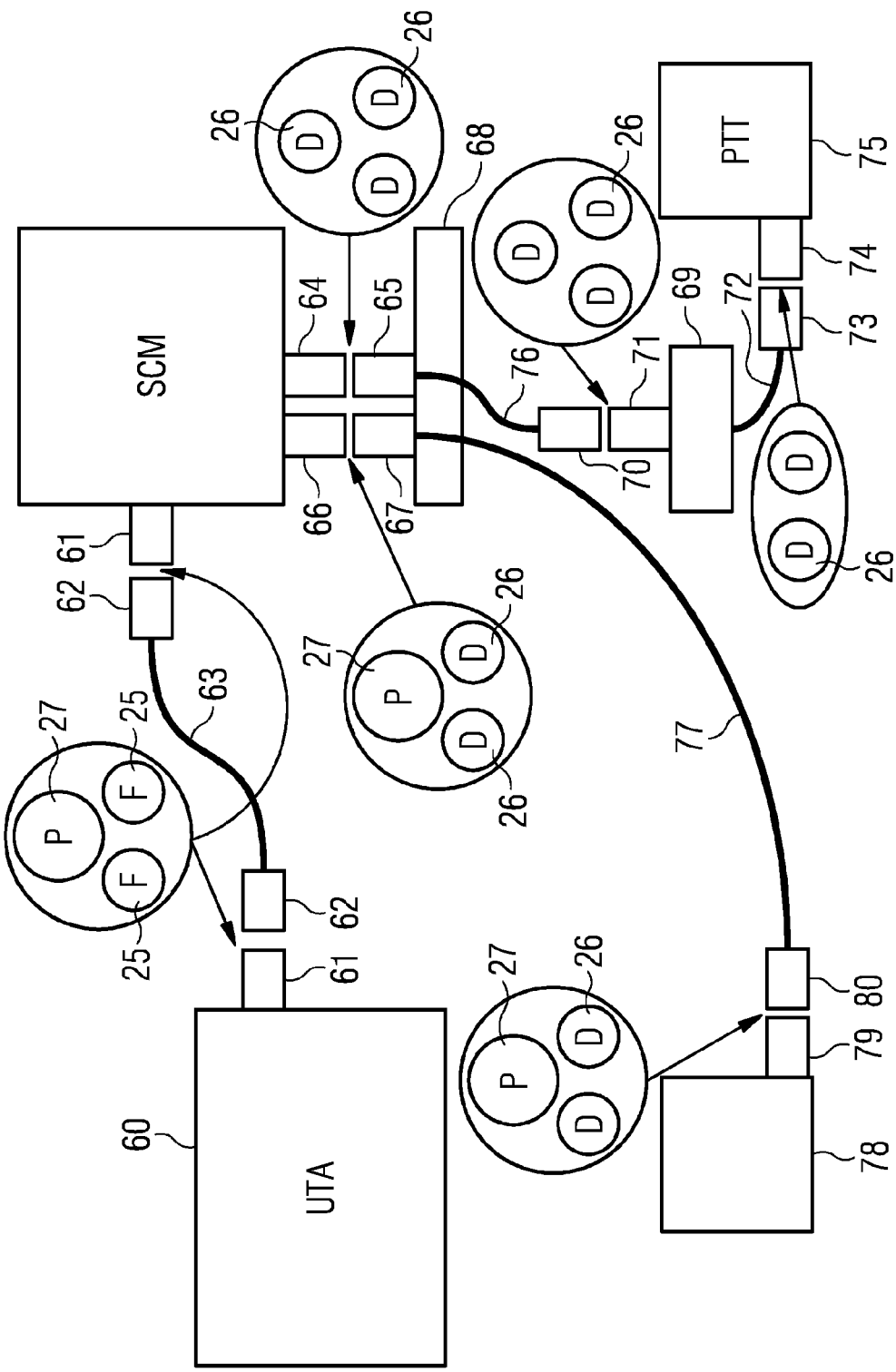
FIG. 4 is a block diagram illustrating a system in which connectors according to the invention may be used.

FIG. 4 illustrates an example of a system in which configurable connectors of the type described may be used with a subsea installation. In this example, the system comprises a plurality of operational modules, located underwater, or subsea, which are connected, or connectable, to a controller. The controller may be located subsea, or may be located topside and connected to the subsea equipment via data links and a suitable communications medium. For example, an umbilical termination assembly (UTA) 60 may be connected to a subsea control module (SCM) 64 via an ROV mateable jumper 63, with ROV mateable connector parts. At each end of the jumper and on the UTA and SCM, hybrid configurable connector plug and receptacle parts 61, 62 according to the invention are provided. The jumper may have a plug connector part at each end, or a plug at one end and a receptacle at the other with the UTA and SCM have corresponding plug or receptacle connector parts fitted. In general, plug connector parts are provided on removable subsea equipment and receptacle connector parts on fixed subsea equipment. The plug design provides greater protection of the pins from the effects of being powered up whilst exposed to seawater, as the pins are within an oil filled chamber. For this example, a power connector unit 27 and two fibre connector units 25 are provided in the configurable connector. The specific configuration may take many different forms, as illustrated below with respect to FIG. 5 and FIGS. 6a to 6j and the arrangements shown for FIG. 4 are purely schematic.

Another part of the subsea system (in this case part of the fixed system) may comprise stab mateable components, the plug and receptacle parts 65, 64 of one of which comprise only data connector units 26, the other stab mateable connector comprising receptacle and plug parts 66, 67 having a combination of data and power connector units 26, 27. From the data line of the stab plate 68, a further jumper 76 may connect to a junction box 69 via a diver mateable connector comprising plug and receptacle connector parts 70, 71, or by direct connection, in this example, using a plurality of purely data connector units 26. From the junction box, a further jumper 72 connects via plug and receptacle connector parts 73, 74 to a pressure or temperature transducer (PTT) 75 on a subsea tree. In this connector, two data connector units 26 are provided. From the hybrid power and data line of the stab plate, an jumper 77 connects to an electric actuator 78, via diver mateable plug and receptacle connector parts 80, 79 with combined power and data connector units 27, 26

Figure 5:
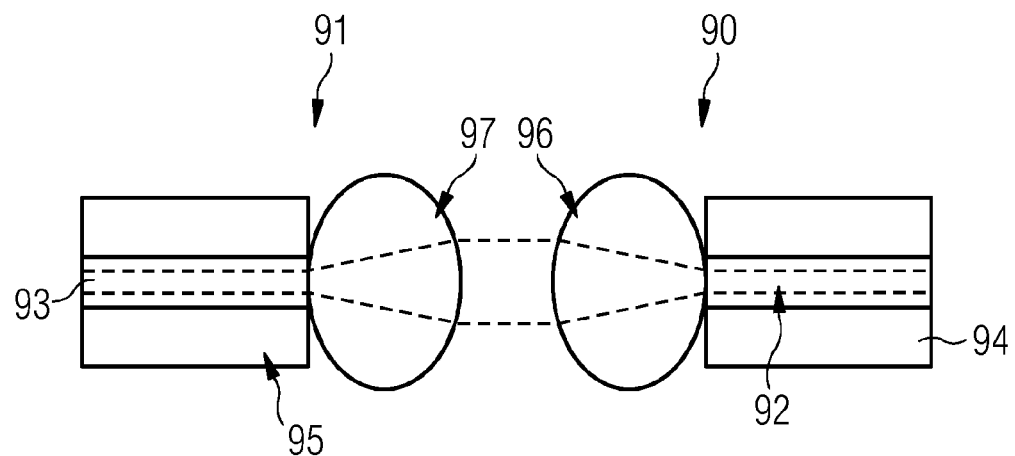
FIG. 5 illustrates more detail of an optical fibre connector unit for a connector according to the present invention; and, FIG. 6 illustrates multiple possible configurations of connector units in a connector according to the present invention.

FIG. 5 illustrates more detail of a particular type of connector unit, an expanded beam optical fibre module 90, 91. In this example, the connector parts comprise optical fibre cores 92, 93 within ceramic polished ferrules 94, 95 and optical lenses 96, 97. Light passes from the core 92 of one connector part 90 though its lens 96 and into the lens 97 of the other connector part 91 and into its optical fibre core 93. Expanded beam fibre connectors have the benefits of reduced complexity and smaller size as compared to other types of fibre connector and may still have sufficiently good performance for many applications. Although the optical fibre cable connector may take the form of an expanded beam connector, other fibre connection designs may also be used, for example as described in EP2977802, EP3168940, EP3377930, or EP3211466.

Figure 6A:
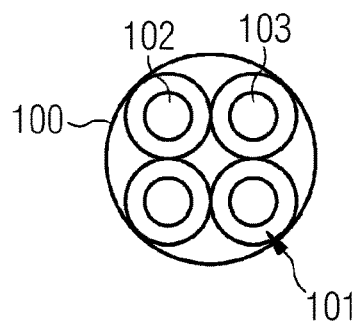
Figure 6B:
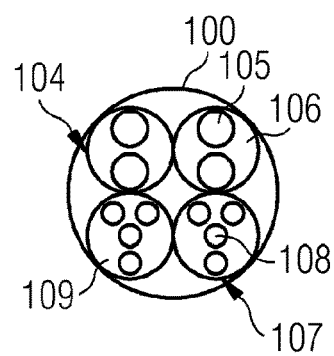
Figure 6C:
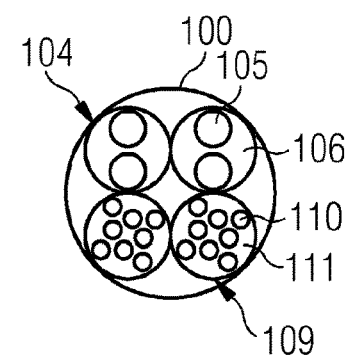
Figure 6D:
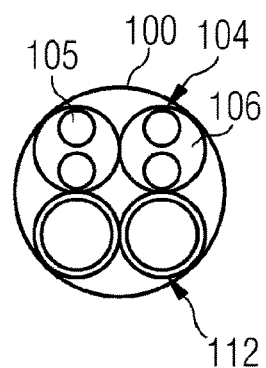
Figure 6E:
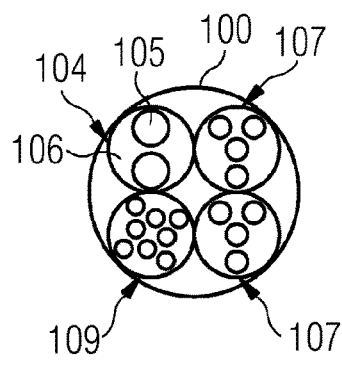

FIGS. 6a to 6j illustrate non-limiting combinations or arrangements of connector bodies 100 with inserts which may be removed and replaced for the configuration as required by the user. FIG. 6a illustrates a connector body 100 comprising four-way power inserts, using four single way power units 101, for example at 3 kV, although the power rating depends on the application and the modular connector is suitable for power up to 5 kV. Typically, power units comprise copper conductors 102, for low electrical resistance, with electrical insulation 103 around the conductors. FIG. 6b illustrates a connector body 100 having two two-way power module inserts 104 to provide four-way power. This may operate at a relatively low power, for example less than or equal to 1 kV, as described above, so insulation 106 may be provided within the module insert to stop the conductors contacting one another and shielding may be provided around the outer circumference or boundary of the insulation in each individual power module 104 to reduce electrical interference with dual channel data or communications connectors, two units 107, each providing one channel, such as a dual channel ethernet, or controller area network bus (CANbus). Alternatively, the shielding layer, or layers, such as a metal screen, may be applied around the data or communications connectors 107, rather than around the power module 104. FIG. 6c illustrates a four-way power insert using two two-way power connector units 104 in combination with two high data rate communications connector units 109, such as 1 Gb Ethernet having multiple cores 110 mounted in an insulating medium 111. FIG. 6d illustrates a hybrid configurable connector body comprising four-way power inserts (two two-way power modules 104) and two fibre connector modules 112. FIG. 6e illustrates a combination of a two-way power connector unit 104, with dual channel communications units 107 and a high data rate connector insert 109.

Figure 6F:
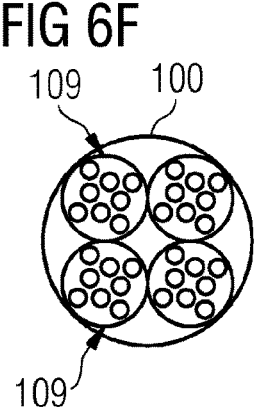
Figure 6G:
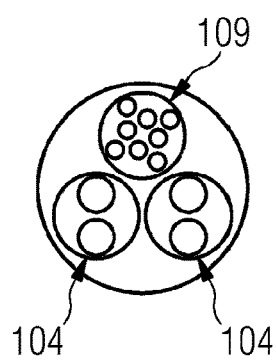
Figure 6H:
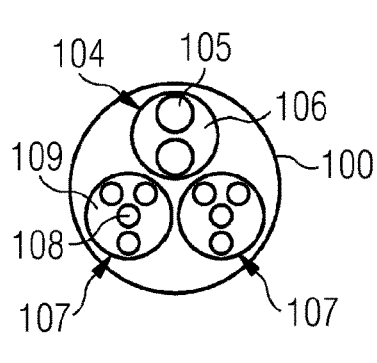
Figure 6I:
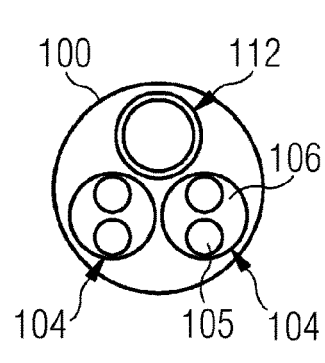
Figure 6J:
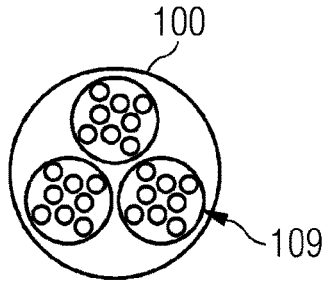

In FIG. 6f, the hybrid configurable connector body is made up entirely of high data rate data connector units 109, in this case four inserts. FIG. 6g illustrates a connector with inserts comprising two two-way power units 104, suitable for operation at or below 1 kV and a high data rate data connector module, such as 1 Gb ethernet, or CANbus. FIG. 6h illustrates a connector body with inserts comprising dual channel communication or data connector units 107 (two units) and a two-way power unit 104. FIG. 6i combines a fibre connector module 112 with two two-way power modules 104. The connector body 100 of FIG. 6j uses three inserts, high density high data rate connector units, to provide twenty four way/channel communication or data transmission. Although not specifically illustrated, the hybrid connector may include connector modules using copper wires, or for wireless or inductive connectors, or may include pneumatic or fluid connector units.

The present invention provides a hybrid power and communications connector comprising interchangeable, configurable modules for different types of power or communication transmission. The connector allows multiple connector options to be consolidated into a single connector using a configurable connector design. This reduces cost by improving manufacturing, or delivery lead times with a reduced suite of components and reduces the installation, maintenance, or operational burden by reducing the total number of connections that need to be made, which in itself provides cost reductions for the operator. Discrete insert modules are optimized for a specific application, such as ethernet, power, or expanded beam fibre and the individual connector units are then assembled into a common connector body and sealed to that body. Reducing the total number of different connectors by forming connectors from modular inserts, rather than manufacturing each connector as bespoke products, reduces the amount of testing required, as well as the smaller overall size of the hybrid connector, as compared to multiple single function connectors, reducing the storage and transport costs. The modular design of the present invention enables further improvement, such as automated methods of manufacturing.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The foregoing examples have been provided merely for the purpose of explanation and are in no way to be construed as limiting of the present invention disclosed herein. While the invention has been described with reference to various embodiments, it is understood that the words, which have been used herein, are words of description and illustration, rather than words of limitation. Further, although the invention has been described herein with reference to particular means, materials, and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may affect numerous modifications thereto and changes may be made without departing from the scope of the invention in its aspects.

It should be noted that the term "comprising" does not exclude other elements or steps and "a" or "an" does not exclude a plurality. Elements described in association with different embodiments may be combined. It should also be noted that reference signs in the claims should not be construed as limiting the scope of the claims. Although the invention is illustrated and described in detail by the preferred embodiments, the invention is not limited by the examples disclosed, and other variations can be derived therefrom by a person skilled in the art without departing from the scope of the invention.

The invention claimed is:

1. A subsea wet-mateable connector, comprising:
   a receptacle connector body, and a plug connector body;
   a first receptacle insert including a first connector unit selected from a power connector unit, a data connector unit, an optical fibre connector unit, a pneumatic connector unit, and a fluid connector unit, the first receptacle insert removably and interchangeably coupled to the receptacle connector body to allow removal and replacement of the first connector unit with a different type of connector unit without damage to the receptacle connector body;
   a second receptacle insert including a second connector unit selected from the power connector unit, the data connector unit, the optical fibre connector unit, the pneumatic connector unit, and the fluid connector unit, the second receptacle insert removably and interchangeably coupled to the receptacle connector body to allow removal and replacement of the second connector unit with a different type of connector unit without damage to the receptacle connector body, the second connector unit being a different type of unit then the first connector unit;

a first plug insert including a third connector unit selected from the power connector unit, the data connector unit, the optical fibre connector unit, the pneumatic connector unit, and the fluid connector unit such that the first plug insert and the first receptacle insert correspond with and engage with one another to complete a connection, the first plug insert removably and interchangeably coupled to the plug connector body to allow removal and replacement without damage to the plug connector body; and a second plug insert including a fourth connector unit selected from the power connector unit, the data connector unit, the optical fibre connector unit, the pneumatic connector unit, and the fluid connector unit such that the second plug insert and the second receptacle insert correspond with and engage with one another to complete a connection, the second plug insert removably and interchangeably coupled to the plug connector body to allow removal and replacement without damage to the plug connector body.

2. The connector according to claim 1, further comprising: an adaptor for removably mounting the plug connector body or the receptacle connector body to an installation device.

3. The connector according to claim 1, wherein the power connector unit comprises a copper, or a copper alloy, conductor.

4. The connector according to claim 1, wherein the data connector unit comprises one of Ethernet, optical fibre, copper wire, wireless, or an inductive connector.

5. The connector according to claim 1, wherein the optical fibre connector unit comprises an expanded beam fibre connector.

6. The connector according to claim 1, wherein the connector units of the inserts comprise integrally formed sections of the inserts.

7. The connector according to claim 1, wherein the receptacle connector body, or the plug connector body, comprises a single machined body having an opening machined therein for each insert and one or more seals to seal the inserts to the body.

8. The connector according to claim 1, wherein the first connector unit and the third connector unit are power connector units and the second connector unit and the fourth connector unit are data connector units, wherein the second connector unit and the fourth connector unit further comprise electrical shielding.

9. The connector according to claim 8, wherein the electrical shielding comprises a metal screen.

\* \* \* \* \*